United States Patent
Katusic et al.

(10) Patent No.: US 10,384,940 B2
(45) Date of Patent: Aug. 20, 2019

(54) PROCESS FOR PRODUCING METAL OXIDE POWDERS BY MEANS OF FLAME SPRAY PYROLYSIS

(71) Applicant: Evonik Degussa GmbH, Essen (DE)

(72) Inventors: Stipan Katusic, Bad Soden (DE); Peter Kress, Karlstein (DE); Harald Alff, Kahl (DE); Tobias Renger, Grosskrotzenburg (DE); Armin Wiegand, Grosskrotzenburg (DE)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 15/740,392

(22) PCT Filed: Jun. 28, 2016

(86) PCT No.: PCT/EP2016/064929
§ 371 (c)(1),
(2) Date: Dec. 28, 2017

(87) PCT Pub. No.: WO2017/001366
PCT Pub. Date: Jan. 5, 2017

(65) Prior Publication Data
US 2018/0194627 A1  Jul. 12, 2018

(30) Foreign Application Priority Data

Jun. 29, 2015 (EP) .................... 15174259

(51) Int. Cl.
*B05B 1/00* (2006.01)
*B05B 1/02* (2006.01)
*C01G 1/02* (2006.01)
*C01B 13/34* (2006.01)
*C01B 33/18* (2006.01)

(52) U.S. Cl.
CPC ............. *C01B 13/34* (2013.01); *B05B 1/005* (2013.01); *B05B 1/02* (2013.01); *C01B 33/18* (2013.01); *C01G 1/02* (2013.01); *C01P 2006/12* (2013.01); *C01P 2006/80* (2013.01)

(58) Field of Classification Search
CPC ......... C01B 13/34; C01B 33/18; B05B 1/005; B05B 1/02; C01G 1/02
See application file for complete search history.

(56) References Cited

U.S. PATENT DOCUMENTS

| 2002/0041963 A1 | 4/2002 | Konya et al. |
| 2006/0193764 A1 | 8/2006 | Katusic et al. |
| 2009/0214866 A1 | 8/2009 | Katusic et al. |

FOREIGN PATENT DOCUMENTS

| DE | 101 39 320 A1 | 4/2002 |
| EP | 1 688 394 A2 | 8/2006 |
| EP | 1 688 394 A3 | 8/2006 |

OTHER PUBLICATIONS

Heine et al (Droplet and Particle Dynamics during Flame Spray Synthesis of Nanoparticles, Ind. Eng. Chem. Res. (2005) 44, 6222-6232) (Year: 2005).*
International Search Report and Written Opinion dated Sep. 20, 2016 in PCT/EP2016/064929 (with English language translation) citing documents AA-AC. AO-AP and AX therein, 22 pages.
L. Mädler, et al. "Controlled synthesis of nanostructured particles by flame spray pyrolysis", Journal of Aerosol Science, XP002390211, 2002, pp. 369-389.

* cited by examiner

Primary Examiner — Melvin C. Mayes
Assistant Examiner — Michael Forrest
(74) Attorney, Agent, or Firm — Oblon, McClelland, Maier & Neustadt, L.L.P.

(57) ABSTRACT

Process for producing metal oxide powders by means of flame spray pyrolysis, in which an aerosol comprising a metal compound is introduced into a flame in a reactor and reacted therein, and the metal oxide powder obtained is separated from gaseous substances, wherein
a) the flame is formed by the ignition of an oxygen-containing gas (1) with a fuel gas,
b) the aerosol is obtained by joint atomization of a solution containing a metal compound and an atomization gas by means of one or more nozzles and
c) the ratio of the spray area to the cross-sectional reactor area is at least 0.2.

10 Claims, No Drawings

PROCESS FOR PRODUCING METAL OXIDE POWDERS BY MEANS OF FLAME SPRAY PYROLYSIS

The invention relates to a process for producing metal oxide powders by means of flame spray pyrolysis.

Chemical Engineering Science, Vol. 53, No. 24, pp. 4105-4112, 1998 describes the production of silica particles by reaction of a siloxane with oxygen/nitrogen mixtures and a fuel gas in a flame diffusion reactor.

DE-A-10139320 discloses the production of spherical silica particles having a particle size of 10 nm to 10 μm and a specific surface area of 3-300 m²/g. This involves converting a non-halogenated siloxane in a flame. The adiabatic flame temperature here is 1600-5600° C. The combustion of the siloxane is conducted by supplying the siloxane in liquid form to the burner and spraying the liquid by means of a nozzle. The spraying of the siloxane is effected using a spraying medium such as air or steam. The maximum droplet diameter is not more than 100 μm.

EP-A-1688394 discloses a process for producing a metal oxide powder having a BET surface area of at least 20 m²/g, by allowing an aerosol to react with oxygen in a reaction space at a reaction temperature of more than 700° C. The aerosol is obtained by atomizing a starting material by means of a multiphase nozzle. Of particular relevance is the droplet diameter $D_{30}$ of 30-100 μm. There is also a 10% limit on the number of aerosol droplets larger than 100 μm.

US2004156773 discloses a process for producing pyrogenic metal oxide particles, comprising the steps of: providing a stream of a liquid starting material composed of a non-halogenated volatilizable metal oxide precursor; providing a stream of a fuel gas and combusting the liquid starting material; injecting the liquid metal oxide precursor into the stream of the combustion gas.

WO2010/069675 discloses a pyrogenic silicon dioxide powder having a low surface area. It is produced by introducing an aerosol obtained by atomizing at least one liquid siloxane with an oxygen-containing gas into a flame. There are additional conditions that apply here with regard to the ratio of oxygen use/demand for oxygen for complete oxidation, to the oxygen/fuel gas ratio and to the cooling process. The droplets formed in the atomization should not be larger than 100 μm.

Powder Technology 246 (2013) 419-433 and Chemical Engineering Research and Design 92 (2014) 2470-2478 examine the effect of nozzle geometry, droplet distribution and droplet evaporation in connection with other process parameters in a flame spray pyrolysis using models.

Even though flame spray pyrolysis is an established process for producing metal oxides, there is only partial understanding of how the interplay of the process parameters determines the properties of the later product. For instance, the complete conversion of the starting materials, especially of carbonaceous starting materials, with simultaneously high throughput constitutes a particular challenge.

It was therefore an object of the present invention to provide an alternative process for producing metal oxides by means of flame spray pyrolysis, which overcomes these problems.

The invention provides a process for producing metal oxide powders by means of flame spray pyrolysis, in which an aerosol containing a metal compound is introduced into a flame in a reactor and reacted therein and the metal oxide powder obtained is separated from gaseous substances, wherein a) the flame is formed by the ignition of an oxygen-containing gas (1) with a fuel gas,
b) the aerosol is obtained by joint atomization of a metal compound and an atomization gas by means of one or more nozzles and
c) the ratio of the spray area to the cross-sectional reactor area is at least 0.2, preferably 0.2-0.8, more preferably 0.3-0.7.

Spray area is understood to mean the area occupied by the aerosol 30 cm below the nozzle exits. The inventive ratio of the spreading area to the cross-sectional reactor area is based on very fine atomization and a large surface coverage that have a favourable effect on the conversion of the aerosol in the flame.

The atomization form of the aerosol is preferably a circular cone having a scatter region of 70-130°. The mean droplet size of the atomized aerosol is preferably 10-150 μm.

In a particular embodiment, the aerosol is produced by virtue of the solution containing the metal compound and the atomization gas flowing into a mixing chamber within the nozzle and internals provided within the mixing chamber dividing the solution into individual droplets under the action of the atomization gas and aerosol from the mixing chamber being introduced through holes into the reactor.

In the process according to the invention, an oxygen-containing gas (1) is used. This is required together with the fuel gas for the lighting of the flame. In addition, an oxygen-containing gas (2) can be introduced into the reactor. The oxygen-containing gases (1) and (2) are generally air. The oxygen-containing gas (1) is referred to as primary air, and the oxygen-containing gas (2) as secondary air. Preferably, the amount of oxygen-containing gas (2) is adjusted such that the ratio of oxygen-containing gas (2)/oxygen-containing gas (1)=0.1-2. Particular preference is given to the range of 0.2-1. The amount of oxygen-containing gas (1)+(2) is such that the fuel gas and the metal compound can be fully converted. The fuel gas used is preferably hydrogen.

The atomization gas used in the process according to the invention may be air, oxygen-enriched air and/or an inert gas such as nitrogen. In general, air is used as atomization gas. With regard to the amount of atomization gas, in the process according to the invention, the ratio of throughput of metal compound/amount of atomization gas is preferably 0.1-10 kg/m³ (STP) and more preferably 0.25-5 kg/m³ (STP).

The metal compound can be used as it is in liquid form or in the form of a solution. Useful solvents are water and organic solvents.

The metal component of the metal compound is preferably selected from the group consisting of Al, Co, Cr, Cu, Fe, Hf, In, Li, Mn, Mo, Nb, Ni, Si, Sn, Ta, Ti, V, Y, Zn and Zr. In the context of the invention, Si, which is particularly preferred, is to be regarded as a metal.

In principle, there is no further restriction in the nature of the metal compounds, provided that they are hydrolysable or oxidizable under the reaction conditions to form the metal oxides. For example, it is possible to use chlorides, nitrates or organometallic compounds. It is likewise possible that the solution contains different metal compounds of one metal or two or more metal compounds having different metal components. In the latter case, mixed metal oxides are formed.

The process according to the invention is particularly suitable for the use of metal compounds which, as well as the metal component, also contain carbon. The process allows the production of low-carbon metal oxides. "Low-carbon" is intended to mean that the carbon content of the metal oxides is less than 0.1% by weight, preferably less than 0.05% by weight.

More particularly, the metal compound may be a silicon compound selected from the group consisting of silanes, polysiloxanes, cyclic polysiloxanes, silazanes and any desired mixtures thereof. These explicitly include tetramethoxysilane, tetraethoxysilane, methyltriethoxysilane, dimethyldimethoxysilane, dimethyldiethoxysilane, trimethylmethoxysilane, trimethylethoxysilane, diethylpropylethoxysilane, silicone oil, octamethylcyclotetrasiloxane (D4), decamethylcyclopentasiloxane, dodecamethylcyclohexasiloxane, hexamethylcyclotrisiloxane and hexamethyldisilazane.

A particular embodiment of the invention envisages the production of a silica powder having a BET surface area of at least 50 m$^2$/g, preferably 70-300 m$^2$/g, and a carbon content of less than 0.1% by weight, preferably 0.01%-0.05% by weight, by means of flame spray pyrolysis, in which an aerosol containing a silicon compound is introduced into a flame in a reactor and reacted therein, and the silica powder obtained is separated from gaseous substances, wherein
a) the flame is formed by the ignition of an oxygen-containing gas (1) with a fuel gas,
b) the silicon compound is selected from the group consisting of silanes, polysiloxanes, cyclic polysiloxanes, silazanes and any desired mixtures thereof,
c) the aerosol is obtained by joint atomization of a solution containing the silicon compound and an atomization gas by means of one or more nozzles and the ratio of the spray area to the cross-sectional reactor area is at least 0.2, preferably 0.2-0.8, more preferably 0.3-0.7, and
d) an oxygen-containing gas (2) is additionally introduced into the reactor, where the ratio of oxygen-containing gas (2)/oxygen-containing gas (1)=0.1-2.

EXAMPLES

Example 1

1.0 kg/h of D4 and 4.0 kg/h of atomizer air are used to produce, by means of an internally mixing two-phase nozzle, Schlick model 0/60-0/64, an aerosol which is atomized into a flame in a reactor. The result is a spray area of 0.88 dm$^2$. The ratio of spray area/cross-sectional reactor area is 0.5. Burning within the reactor is a hydrogen/oxygen gas flame composed of hydrogen (2 m$^3$ (STP)/h) and primary air (20 m$^3$ (STP)/h), in which the aerosol is reacted. In addition, secondary air (5 m$^3$ (STP)/h) is introduced into the reactor. After cooling, the silica is separated from gaseous substances at a filter. The mean residence time of the reaction mixture in the reactor is 1.67 s. The temperature 0.5 m below the flame is 642° C. The silica has a BET surface area of 202 m$^2$/g and a carbon content of 0.04% by weight.

Examples 2-8 are conducted analogously. The amounts used are shown in the table.

The ratio of spray area/cross-sectional reactor area varies from 0.35-0.62. The silicas obtained have a BET surface area of 85-293 m$^2$/g, with a consistently very low carbon content of 0.01%-0.04% by weight.

Comparative examples C1-C4 are also conducted analogously to Example 1, except that an externally mixing two-phase nozzle, Schlick model 02-09, is used here. The result is distinctly smaller spray areas and correspondingly much lower ratios of spray area/cross-sectional reactor area. The silicas obtained have a BET surface area of 16-70 m$^2$/g, with a distinctly increased carbon content of 0.13%-0.16% by weight.

TABLE

Feedstocks and reaction conditions; physical properties

| | | Example | | | | | | | | | | | |
|---|---|---|---|---|---|---|---|---|---|---|---|---|---|
| | | 1 | 2 | 3 | 4 | 5 | 6 | 7 | 8 | C1 | C2 | C3 | C4 |
| D4 | kg/h | 1.0 | 2.0 | 18 | 15 | 15 | 15 | 110 | 120 | 250* | 240* | 10 | 15 |
| Atomizer air rate | m$^3$(STP)/h | 4.0 | 3.4 | 30 | 30 | 15 | 30 | 55 | 50 | 35.8 | 17.3 | 12.0 | 7.00 |
| D4/atomizer air rate | kg/m$^3$(STP) | 0.25 | 0.58 | 0.60 | 0.50 | 1.00 | 0.50 | 2.00 | 2.40 | 6.98 | 13.87 | 0.83 | 2.14 |
| Spray area[1] | dm$^2$ | 0.88 | 0.88 | 3.44 | 3.44 | 2.68 | 3.44 | 12.2 | 12.2 | 0.41 | 0.41 | 0.18 | 0.18 |
| Spray area/cross-sectional reactor area | | 0.50 | 0.50 | 0.45 | 0.45 | 0.35 | 0.45 | 0.62 | 0.62 | 0.05 | 0.05 | 0.02 | 0.02 |
| Hydrogen | m$^3$(STP)/h | 2.0 | 4.0 | 24 | 20 | 22 | 30 | 45 | 50 | 40 | 45 | 27 | 27 |
| Primary air | m$^3$(STP)/h | 20 | 20 | 110 | 80 | 90 | 100 | 600 | 800 | 5000 | 5100 | 152 | 152 |
| Secondary air | m$^3$(STP)/h | 5 | 25 | 40 | 45 | 60 | 50 | 400 | 250 | — | — | — | — |
| Secondary/primary air | | 0.25 | 1.25 | 0.36 | 0.56 | 0.67 | 0.50 | 0.67 | 0.31 | — | — | — | — |
| Mean temperature | ° C. | 642 | 664 | 413 | 681 | 826 | 750 | 695 | 752 | 950 | 1030 | 869 | 974 |
| Mean residence time | s | 1.67 | 1.02 | 1.96 | 1.78 | 1.40 | 1.45 | 0.59 | 0.52 | 0.04 | 0.04 | 1.31 | 1.11 |
| BET surface area | m$^2$/g | 202 | 128 | 85 | 139 | 197 | 293 | 120 | 200 | 60 | 70 | 25 | 16 |
| Carbon content | % by wt. | 0.04 | 0.01 | 0.02 | 0.03 | 0.04 | 0.03 | 0.02 | 0.03 | 0.14 | 0.15 | 0.13 | 0.16 |

*D4 content = 75% by weight diluted with petroleum spirit;
[1]30 cm below nozzle

The invention claimed is:

1. A process for producing metal oxide powders by flame spray pyrolysis, the process comprising:
    introducing an aerosol comprising a metal compound into a flame in a reactor and reacted therein, and separating the metal oxide powder obtained from gaseous substances, wherein
    a) the flame is formed by the ignition of an oxygen-containing gas (1) with a fuel gas,
    b) the aerosol is obtained by joint atomization of a solution comprising a metal compound and an atomization gas via one or more nozzles and
    c) a ratio of the spray area to the cross-sectional reactor area is at least 0.2.

2. The process according to claim 1, wherein the atomization form of the aerosol is a circular cone having a scatter region of 70-130°.

3. The process according to claim 1, wherein a mean droplet size of the atomized aerosol is 10-150 µm.

4. The process according to claim 1, wherein the aerosol is produced by virtue of the solution comprising the metal compound and the atomization gas flowing into a mixing chamber within the one or more nozzles and internals provided within the mixing chamber dividing the solution into individual droplets under the action of the atomization gas and aerosol from the mixing chamber being introduced through holes into the reactor.

5. The process according to claim 1, wherein an oxygen-containing gas (2) that surrounds the flame is introduced into the reactor through one or more points in the reactor wall.

6. The process according to claim 5, wherein an amount ratio of the oxygen-containing gas (2)/oxygen-containing gas (1)=0.1–2.

7. The process according to claim 1, wherein a metal component of the metal compound is selected from the group consisting of Al, Co, Cr, Cu, Fe, Hf, In, Li, Mn, Mo, Nb, Ni, Si, Sn, Ta, Ti, V Y, Zn and Zr.

8. The process according to claim 1, wherein the metal compound comprises carbon and a metal component.

9. The process according to claim 1, wherein the metal compound is a silicon compound selected from the group consisting of silanes, polysiloxanes, cyclic polysiloxanes, silazanes and any desired mixtures thereof.

10. A process for producing a silica powder having a BET surface area of at least 50 $m^2/g$ and a carbon content of less than 0.1% by weight by flame spray pyrolysis, the process comprising:
    introducing an aerosol comprising a silicon compound into a flame in a reactor and reacted therein, and the silica powder obtained is separated from gaseous substances,
    wherein
    a) the flame is formed by the ignition of an oxygen-containing gas (1) with a fuel gas,
    b) the silicon compound is selected from the group consisting of silanes, polysiloxanes, cyclic polysiloxanes, silazanes and any mixtures thereof,
    c) the aerosol is obtained by joint atomization of a solution comprising the silicon compound and an atomization gas via one or more nozzles and a ratio of the spray area to the cross-sectional reactor area is at least 0.2 and
    d) an oxygen-containing gas (2) is additionally introduced into the reactor, where an amount ratio of oxygen-containing gas (2)/oxygen-containing gas (1)=0.1–2.

* * * * *